INVENTORS
HARRY BENDER
BY HARRY D. BAJARS
John A. Harvey
ATTORNEY

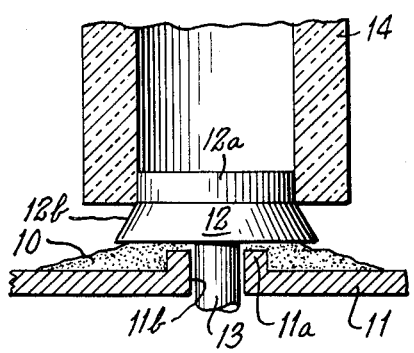
Fig. 1.
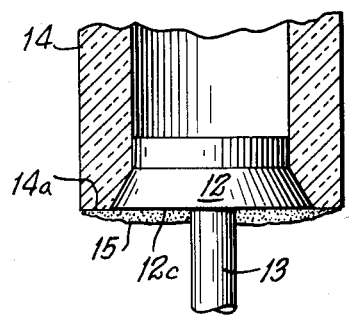
Fig. 2.
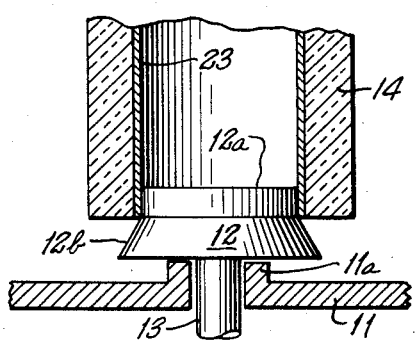
Fig. 4.
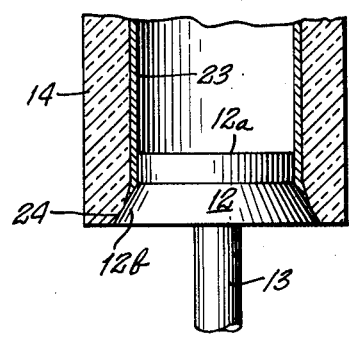
Fig. 5.
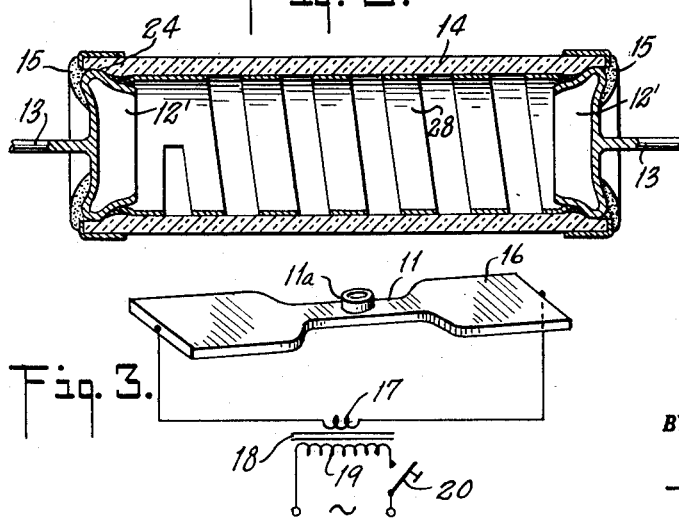
Fig. 6.
Fig. 3.
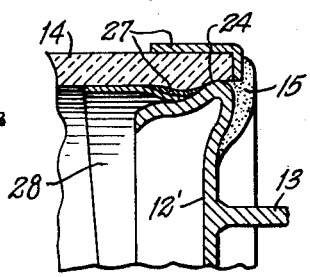
Fig. 6a.
INVENTORS
HARRY BENDER
BY HARRY BAJARS
John A. Harvey
ATTORNEY June 29, 1965  H. BENDER ETAL  3,192,497
GLASS TO METAL SEAL Filed June 28, 1963  2 Sheets-Sheet 2

United States Patent Office 3,192,497
Patented June 29, 1965

3,192,497
GLASS TO METAL SEAL
Harry Bender, Fullerton, Calif., and Harry D. Bajars, Livingston, N.J., assignors, by mesne assignments, to General Mills, Inc., Minneapolis, Minn., a corporation of Delaware
Filed June 28, 1963, Ser. No. 292,212
2 Claims. (Cl. 338—308)

This application is a continuation-in-part of our co-pending, co-assigned patent application Serial No. 94,558, filed March 9 1961, entitled "Glass to Metal Seal," now abandoned.

This invention relates to glass to metal seals and their method of fabrication. In a particular aspect, the invention relates to a glass to metal seal, and method of hermetically sealing, wherein a metal plug member is hermetically sealed in an orifice of a glass envelope while concurrently establishing a permanent electrical connection between the plug member and an electrically conductive film adherent to the inner surface of the envelope adjacent the orifice. The invention has particular utility in the fabrication of hermetically sealed, precision, electrical resistors and will be described in that connection.

Glass to metal seals are extensively employed in the construction of electronic tubes and various high performance, special purpose electrical devices requiring hermetic sealing within an enclosing housing or envelope. The fabrication of these seals has heretofore required the application of a flame to the glass and the use of temperatures sufficiently high as to fuse the glass and cause it to wet the surface of the metal to which it is to be sealed. The heating of the glass must be confined to the region at which the seal is effected, and great care must then be used in subsequently annealing the glass over a much more extensive region around the seal to remove stresses and strains created by the localized heating at the seal. Electrical connections to the metal insert member of the glass to metal seal are usually made by welding a conductor to the insert member or to an electrically conductive extension thereof after the glass to metal seal has been completed and before the enclosure or envelope of which it forms a part is fully closed.

It is an object of this invention to provide an improved glass to metal seal and an improved method of effecting a glass to metal seal.

Another object of this invention is to provide a substantially gas-tight electrical device embodying the glass to metal seal of this invention.

Yet another object of this invention is to provide a method of effecting a glass to metal seal at a relatively low temperature and by use of highly localized application of heat.

It is a further object of this invention to provide a simple, convenient and relatively rapid method for effecting a glass to metal seal.

Other objects and advantages of the invention will appear as the detailed description thereof proceeds in the light of the drawings forming a part of this application and in which:

FIG. 1 schematically illustrates a particular method and a portion of an apparatus for effecting a glass to metal seal in accordance with one embodiment of this invention;

FIG. 2 illustrates a glass to metal seal fabricated in accordance with the method described in connection with FIG. 1;

FIG. 3 schematically illustrates the construction of a heater suitable for forming glass to metal seals embodying the invention;

FIG. 4 schematically illustrates a modified practice of this invention by which simultaneously to effect a glass to metal seal and an electrical connection between a metal plug member and an electrically conductive film adherent to the inner surface of the glass member;

FIG. 5 illustrates a glass to metal seal fabricated in accordance with the method illustrated in FIG. 4;

FIG. 6 illustrates in cross-section a hermetically sealed metal film resistor embodying glass to metal seals prepared in accordance with this invention, FIG. 6a being an enlarged fragmentary view of the FIG. 6 structure to illustrate more clearly certain details thereof.

Figure 7:
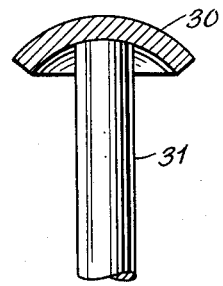
FIGS. 7–10 illustrate special configuration of metal plug members useful in the practice of this invention.

In accordance with one embodiment of this invention a hermetic seal between a glass surface and a metal surface, as well as a permanent electrical connection between the metal surface and an electrically conductive film adherent to the glass surface, is obtained by coating or othrewise depositing on the glass surface an adherent electrically conductive metal film, such as sliver, and then pressing the metal surface into contact with the film-coated glass surface under conditions of temperature and pressure such that a portion of the metal film is placed into electrically conductive contact with the metal surface and another portion of the metal film is distorted and broken while conforming the glass surface to the configuration of the metal surface under pressure contact therewith and thus bring the resulting exposed glass surface into direct contact with the metal surface to permit fusing of the glass surface thereto.

In accordance with another feature of this invention an improved seal between a glass surface and a metal surface is effected by heating a mass of finely divided glass solder to its melting point, the glass employed as the solder glass having a melting point substantially lower than the melting point of the glass making up the glass surface, and thereupon bringing the metal surface and the glass surface in engagement therewith into direct contact with the mass of fused solder glass whereby the fusde solder glass not only aids in conducting heat to the metal surface to effect a glass to metal seal between the metal and glass surfaces but also forms an unbroken solder-glass hermetic seal extending over the metal and glass surfaces in direct contact therewith.

In the practice of this invention, any of the well known and commercially available types of glass, metal, and glass solder useful in the fabrication of glass and glass to metal seals in electronic components and apparatus may be utilized and many such materials are disclosed in the book entitled "Materials and Techniques for Electron Tubes," by W. H. Kohn, published by Reinhold Publishing Company, New York, N.Y., to which reference is made.

Referring now to the drawings, FIGS. 1–3 illustrate an improved glass to metal seal and the method of and apparatus for fabrication thereof in accordance with the present invention. In forming such seal, a small mass 10 of a conventional finely divided solder glass is placed on an electrical heater 11 having a construction presently to be described more fully and which is provided with an upwardly directed flange portion 11a having a centrally positioned orifice 11b extending therethrough.

When a sufficient mass of glass powder 10 has been deposited on the heater 11, electrical current is passed through the latter to heat it and bring the solder glass to its molten state. Thereafter a metal cap or plug 12 of cylindrical cross-section, having an integrally affixed concentric wire lead 13, is placed upon the heater 11 with the wire lead 13 extending through the heater orifice 11b and the plug 12 resting upon the flange 11a and engaging the molten solder glass 10. The plug 12 may have a cylindrical end portion 12a forming a smooth sliding fit with the internal bore of a hollow glass cylindrical tube 14 which is now placed upon the plug 12 and lightly pressed down to engage the end of the cylinder with a flared skirt portion 12b of the plug.

Heat from the heater 11 is transferred directly and through the molten solder glass to the plug 12, and the latter thereupon heats and softens the inside end portion of the glass tube 14. Continued pressure on the glass tube and the heat applied to it through the plug 12 causes the softening end portion of the tube to deform to the conical contour of the flared skirt portion 12b of the plug, and the tube 14 thus is pressed down over the plug until the end surface of the tube engages the molten solder glass 10.

While this is occurring, the highly localized heat applied by the plug 12 to the inside lower end portion of the tube 14 causes a thin concentric surface lamina of the tube to melt and wet the opposing exterior surface of the plug. This condition is evidenced visually by the sudden appearance of a thin black concentric band at the juncture of the plug and tube, whereupon the wire lead 13 is manually grasped below the heater 11 and pushed upwardly to lift the plug and tube above the heater where they quickly cool and a film of solder glass wetting the bottom surface of the plug and end surface of the tube solidifies.

The resulting glass to metal seal structure is illustrated in FIG. 2. This structure has two hermetic seals, one between the glass tube 14 and a concentric annular band of the surface of the flared skirt portion 12b of the plug 12 while the second seal is formed by the solidified layer 15 of solder glass which is sealed to the lower surface 12c of the plug 12 and the end surface portion 14a of the tube 14. The relative thickness of the solidified layer 15 of solder glass is controlled in part by the height of the flange 11a (FIG. 1) which serves to prevent the solder glass from being pushed out from beneath the plug 12 while pressure is being exerted on the tube 14 in effecting the seal. This double hermetic seal has been formed at relatively low temperature and in a very short time involving only a matter of a few seconds. Such dual seal has superior strength since a larger area is bonded than in the structures heretofore known, and the temperature required in effecting the seals is at least 100° C. lower than would otherwise be required in sealing processes heretofore used. It has been found, using sensitive detection methods, that the seal thus formed is impervious to the passage of hydrogen therethrough.

The solder glass 10 is a glass which has a relatively low-temperature melting or softening point, such as one characterized by a relatively high amount, usually a major amount, of lead oxide, about 70–85%, and minor amounts of boron oxide, about 10–20%, and silicon oxide, about 5–15%. The solder glass must have a flow point below that of the glass tube, and its expansion coefficient should be relatively close to that of the glass tube. Lime glass and lead glass are suitable for the material of the tube 14, and a conventional No. 52 alloy is suitable for the material of the plug 12.

FIG. 3 schematically illustrates the construction of a heater suitable for forming glass to metal seals embodying the invention. The heater portion 11 and associated flange 11a referred to in connection with FIG. 1 are comprised as a narrowed waist portion of a conductive bar 16 which may be of nichrome having relatively heavy end portions connected to the terminals of a low-voltage high-current secondary winding 17 of a transformer 18 having a primary winding 19 energized through a manually operable switch 20 from a suitable alternating current source. Upon manual closure of the switch 20, a relatively large electrical alternating current flows through the bar 16 and the narrowed waist portion of the bar provides the major portion of its electrical resistance and thus concentrates substantially the entire $I^2R$ heating of the bar at the region of this waist portion (the symbol I representing the magnitude of the alternating current flowing in the bar and the symbol R its effective electrical resistance principally concentrated at the narrowed waist portion 11).

FIGS. 4 and 5 of the drawing illustrate a modified form of the invention similar to that of FIGS. 1 and 2, similar components being identified by similar reference numerals, except that the glass tube 14 is provided on its inside surface with an adherent electrically conductive film 23 which may conveniently be of silver deposited in conventional manner. This metallic film is shown for clarity of illustration as having substantial thickness, but in practice will be a relatively thin one. In this form of the invention, both a glass to metal seal and an electrical connection between the metal plug 12 and the electrically conductive film 23 are effected. As described in reference to FIG. 1, the plug 12 is heated by means of the transfer of heat through the flange 11a of the heater 11 although omitting the use of solder glass from the seal structure makes it desirable also to omit the flange 11a of the heater so that the entire end surface of the plug 12 then engages the surface of the heater 11 for more rapid transfer of heat to the plug. The glass tube 14 as before is positioned upon the plug 12 with light pressure, and becomes pressed down over the plug 12 after the inside end portion of the glass has been sufficiently heat softened. As the metal plug 12 enters the end of the tube, the outwardly flared skirt portion 12b presses into direct contact with the metal film 23 and deforms both the film and the end portion of the glass tube. This deformation exposes a fresh, uncoated glass surface, so that this uncoated glass surface is brought into direct contact with the flared skirt portion of the plug and forms a glass to metal seal thereto. The glass tube 14 is pressed over the plug 12 sufficiently far that the end surface of the tube is substantially flush with the bottom surface of the plug. At this time, both the peripheral surface of the extended portion 12a of the metal plug and the upper peripheral conical surface of its flared skirt portion 12b engage the metal film 23 to provide an electrical connection between the plug and the film 23. The resulting assembly is then lifted from the heater 11, as described in connection with FIG. 1, and permitted to cool to provide the structure illustrated in FIG. 5 wherein there is a glass to metal concentric band seal at the region 24 between the flanged skirt portion 12b of the metal plug and the glass tube 14. The structure also permanently retains the electrical connection between the metal film 23 and the plug 12 earlier described. Glass solder may be used, if desired, to provide a double hermetic seal as earlier described in relation to FIGS. 1 and 2.

FIG. 6 illustrates in cross-sectional view a resistor having glass to metal seals embodying the present invention and formed according to the process of the invention. FIG. 6a is an enlarged fragmentary view of a portion of the FIG. 6 structure to illustrate more clearly certain details thereof. Components of the FIG. 6 structure corresponding to the same components of the glass to metal seals earlier described are identified by similar reference numerals and corresponding components are identified by similar reference numerals primed. The glass tube 14 is initially coated at each end with silver paint 27, as by dipping the end of the tube in a silver paint solution so that the paint coats a short end length of both the inner and exterior surfaces of the tube and extends around its end surface. The silver paint, which may be of conventional composition, is then fired in conventional manner in an oven to bond the paint to the surfaces of the tube 14 and thus provide an adherent conductive surface.

The glass tube with its silvered ends is then conveniently placed in a lathe and a writing pen, having a hollow point formed at a right angle on the end of a hollow tube, is inserted in an end of the glass tube and a solution of a resistive material is fed through the pen and deposited as a spiral film 28 (which may be a continuous film if the spiral turns are overlapped) on the inner surface of the tube 14 as shown. The ends of this resistive film are made to overlay, preferably as continuous concentric rings or bands, the silver paint 27 provided on the interior end surfaces of the tube 14. The glass tube with its resistive deposit is then dried or otherwise treated to adhere the deposit to the tube wall and provide an electrically conductive surface of a desired value of resistance extending between the silver films 27 and electrically and mechanically bonded thereto. The solution used to form the resistive film 28 may, by way of example, be that disclosed in the copending application of Harry Bajars et al., Serial No. 94,492, filed March 9, 1961, entitled Metal Film Resistor and Method of Its Formation, filed concurrently herewith, and assigned to the same assignee as the present application. If the solution of this copending application is used, it is heat treated according to the process disclosed in the copending application to form an adherent electrically resistive metal film between the end silver films 27.

After the resistive film 28 has been placed on the interior surface of the glass tube 14, one end of the latter is inserted over and pressed down upon a metal plug 12', placed upon the heater 11 earlier described. The metal plug 12', shown by way of illustration as being of hollow cup shape formed conveniently by stamping or drawing from light stock sheet material, causes the silver film 27 and the inner end wall of the tube 14 to deform and expose a fresh, uncoated glass surface which is thus brought into direct contact with the surface of the plug 12' and forms a concentric annular seal 24 between the tube 14 and the plug 12'. A solidified layer 15 of solder glass forms a second hermetic seal as described in relation to the structure and process of FIGS. 1 and 2. The silver film 27 on the interior end wall surface of the glass tube 14 electrically engages the metal plug 12' while the end seal is being formed, and this electrical connection is permanently retained and locked in place by the glass to metal seals when the structure is removed from the heater as described in relation to the structure of FIG. 5. Having completed the sealing of a metal plug 12' into one end of the glass tube 14, a similar metal plug is similarly sealed into the other end of the glass tube to complete the resistor structure.

Figure 8:
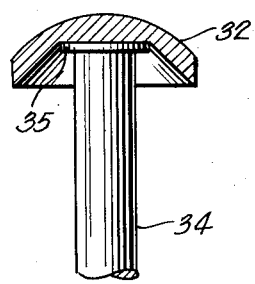
Figure 10:
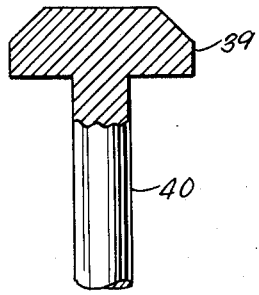
Figure 9:
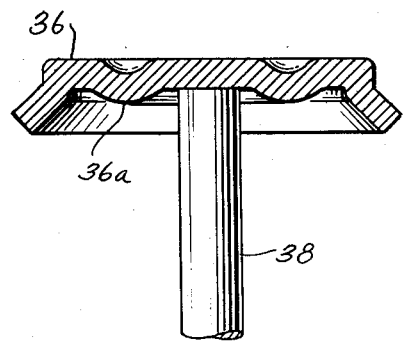

Referring now to FIGS. 7–10 in the drawings there are illustrated therein various plug configurations useful in the practice of this invention. In general, the various illustrated plug configurations, particularly those illustrated in FIGS. 7, 8 and 9, are designed to provide some measure of radial inward yield to relieve glass strains upon cooling of the glass tubing or envelope after the glass-to-metal seal is completed. The plug configuration illustrated in FIG. 10 is of particular interest since such plugs can readily and simply be formed in large quantities by automatic machines and at low cost.

Referring now to FIG. 7 the plug 30 of segmental hemisphere configuration is butt welded to lead 31. Plug 30 is desirably made of a nickel iron alloy such as Niron No. 52 and has a thickness of about 0.010". Lead 31 is likewise desirably made of a nickel iron alloy such as Niron No. 52 or other suitable alloys such as Dumet 180 alloy and dead soft nickel A alloy. The segmental hemisphere configuration of plug 30 desirably has a radius of about 0.055" and a projected diameter of about 0.068".

In FIG. 8 plug 32 is likewise of a segmental hemisphere configuration and lead 34 thereof is "headed" to provide button 35 to permit easier spot welding of lead 34 to plug 32. Plug 32 and lead 34 are desirably made of the same material as corresponding portions of the device illustrated in FIG. 7. In the device illustrated in FIG. 8 the thickness of plug 32 is in a range from about 0.010" to about 0.012".

In the devices illustrated in FIGS. 7 and 8 the thin metal plugs 30 and 32, respectively, become more cup-shaped when the periphery is deformed radially inwardly as the glass cools during the completion of the glass-to-metal seal. Plugs 30 and 32 are readily fabricated by spot welding their respective leads to flat stock and then punching or deforming by means of a die which accepts the lead in an axial bore of the die.

Referring now to FIG. 9, plug 36 is provided with a concentric corrugation 36a which easily deforms when, during completion of the glass to metal seal, the glass cools and shrinks radially. The glass solder seal is controlled to provide a peripheral ring seal so that the molten glass solder does not fill the corrugation and reduce its flexibility. At the completion of the glass to metal seal the corrugation 36a of plug 36 permits the central portion to flex as lead 38 is moved. This prevents lead movement from imparting a strain to the glass tubing or envelope at the region of the seal. Plug 36 has an overall diameter of about 0.144" and is made up of flat stock having a thickness of about 0.012" thick and, desirably, of the same materials as plugs 30 and 32 of FIGS. 7 and 8, respectively.

In the special plug configuration illustrated in FIG. 10 plug 39 of a configuration similar to plug 12 in FIGS. 1, 2, 4 and 5, is a solid metal button integral with lead 40 and of the same material. Plug 39 on lead 40 is formed by "heading" (like the forming of a nail head) the end of lead 40. Therefore, plug 39 is capable of being fabricated in large quantities by automatic machines and at low cost. In FIG. 10 lead 40 has a diameter of about 0.025" and plug 39 has an overall diameter of about 0.070" and an overall thickness of about 0.025".

It will be apparent from the foregoing description of the invention that glass to metal seals embodying the invention and formed according to the process thereof may be quickly and readily fabricated in a rapid manner and with a minimum of heat application. Such seals may, as desired, be either a single annular band form of seal or one which is further improved and strengthened mechanically by a solder glass seal formed in simple rapid manner concurrently with formation of the annular seal. Glass to metal seals according to the invention have the further important advantage that electrical connections may be simply and easily and reliably made between the metal sealing member and a metallic film surface placed upon the wall of the glass member. As previously described, each such electrical connection is made concurrently with formation of a glass to metal seal and is permanently locked in place by the latter, thus to insure an inexpensive, quickly made, and highly reliable electrical connection from the metal member to a conductive circuit on the interior of a glass enclosure in which the metal member is sealed.

While specific forms of invention have been described for purposes of illustration, it is contemplated that numerous changes may be made without departing from the spirit of the invention.

What is claimed is:

1. An article comprising a length of glass tubing having an adherent metal film over a length of its inside surface adjacent both ends thereof, metal members of cylindrical cross-section closing said ends of said tubing and electrically engaging individual ones of said metal films and hermetically sealed to said tubing by concentric glass to metal seals, an elongated electrically-resistive film adherent to the inner wall of said tubing and electrically bonded at its ends to said metal films to provide a resistive electrical path therebetween, and a layer of solidified solder glass extending over the juncture of each of said members and the adjacent end of said tubing and hermetically sealed to each thereof over regions lying on each side of each said juncture.

2. A method of effecting a seal between a glass surface defining an orifice and a metal plug which comprises depositing an electircally conductive metal film on said glass surface adjacent to and including the wall surface of said orifice, fitting said metal plug into said orifice, applying a molten mass of finely divided glass having a softening point substantially below the softening point of the glass making up said glass surface onto said metal plug to heat said metal plug and to heat said glass surface and said metal film in contact with said metal plug, pressing said metal plug into said orifice to distort said glass surface defining said orifice and said metal film thereon to bring said glass surface into direct contact with said metal plug and form a glass to metal seal therebetween while maintaining said plug in electrically conductive contact with said film, and providing relative separation between said plug and said molten mass of finely divided glass to permit cooling of said plug.

References Cited by the Examiner
UNITED STATES PATENTS

| | | | |
|---|---|---|---|
| 2,221,868 | 11/40 | Geiger et al. | 65—60 |
| 2,559,943 | 7/51 | Cerny | 338—274 |
| 2,560,593 | 7/51 | Pask et al. | 65—43 |
| 3,028,288 | 4/62 | McKeirnan et al. | 65—60 |

ALEXANDER WYMAN, *Primary Examnier.*

EARL M. BERGERT, *Examiner.*